March 2, 1965     W. ANDERSEN     3,171,732
GLASS BOTTLE PARISON MACHINE
Filed July 31, 1961
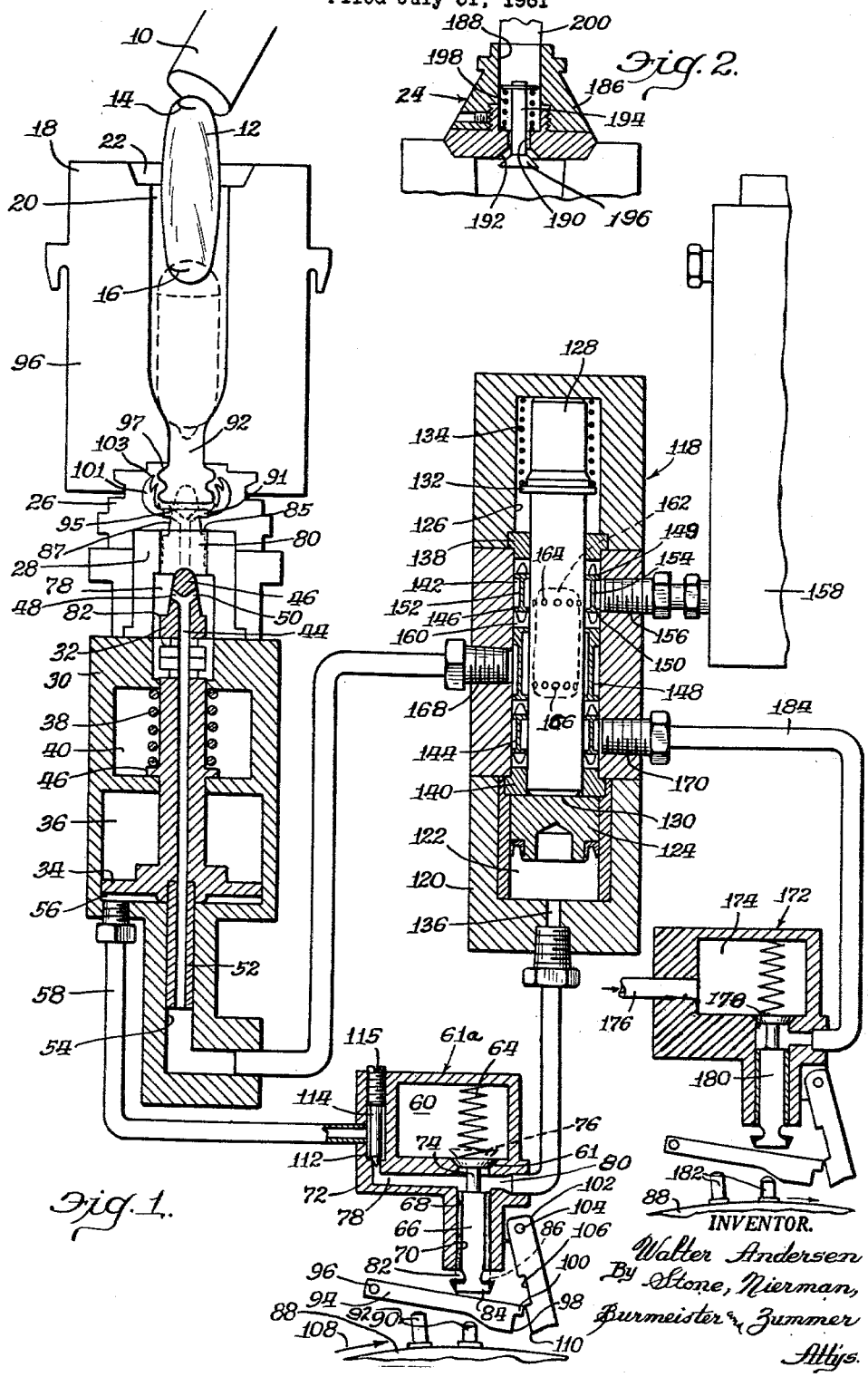
INVENTOR.
Walter Andersen
By Stone, Nierman,
Burmeister & Zimmer
Attys.

United States Patent Office 3,171,732
Patented Mar. 2, 1965

3,171,732
GLASS BOTTLE PARISON MACHINE
Walter Andersen, Streator, Ill., assignor, by direct and mesne assignments, to Chem-Met-Anderson Engineering Company, Chicago, Ill., a corporation of Illinois
Filed July 31, 1961, Ser. No. 128,092
5 Claims. (Cl. 65—229)

This invention relates to apparatus for making a bottle parison. It is a continuation-in-part of United States application Serial No. 30,818, filed May 23, 1960.

The object of this invention is to provide apparatus for making the bottle and practicing the method described in the application of which this is a continuation-in-part, and more particularly the bottle and method of making set forth in copending application Serial No. 127,203, filed July 27, 1961, which also is a continuation-in-part of the first-mentioned application. As set forth in the copending application, Serial No. 127,203, applicant seeks to make a bottle which has a light bottom with an external concave annulus in its bottom, has side walls of uniform thickness, and has an orifice having a cylindrical interior opening. In making this bottle, applicant employs a method which utilizes hot glass from the center of a gob of glass charged to a parison mold and which draws the hot glass down into the orifice mold of the parison mold by means of a vacuum. By this step, he is able to obtain a cylindrical interior orifice for a bottle. After the glass in the orifice has set sufficiently, applicant counterblows under circumstances such that the still soft center of the glass in the parison is used to form the bottom of the bottle. In order to set the bottom and partially set it in the parison mold, applicant brings the upper surface of the glass gob in contact with a cold surface of metal.

The object of this invention is to provide the apparatus which will produce the bottle and enable one to practice the method described in said copending application Serial No. 127,203.

The invention is disclosed in connection with drawings which comprise two figures:

FIGURE 1 shows the complete assembly including parison mold, plunger, timer, and air valves at the time when the plunger is down and the gob of glass has partially dropped into the parison mold;

FIGURE 2 is a portion of the top of the parison mold with a baffle in position.

The figures are schematic, although portions are cross sections of the apparatus itself.

Referring to FIGURE 1, the numeral 10 identifies a deflector from which has just dropped a gob of glass 12 having cutoff lines 14 and 16. The gob of glass has halfway entered by force of gravity a parison mold. The parison mold consists of two matching plates such as 18, and the plates have complementary cavities such as 20. The plates swing on vertical axes and close and open as the glass-making process proceeds. The top of the parison mold which is open has shoulders which form a baffle seat 22. The baffle 24, shown in FIGURE 2, swings on an arm (not shown), which positions the baffle on the seat 22 of FIGURE 1.

Mounted in the base of each half of the blank mold is a ring neck mold 26, and into the base of this a thimble 28 seats. Mounted beneath the thimble is a casting 30 which houses a ring neck mold plunger 32. This plunger is mounted on a piston 34 which is movable vertically in the cylinder 36. A spring 38 positioned in a chamber 40 between the top of the chamber and a collar 42 on the plunger constantly urges the plunger into the lower position shown in FIGURE 1. Centrally of the plunger is a passageway 44 which immediately beneath the plunger tip 46 branches into two ducts 48 and 50. Mounted coaxially on the bottom of the piston 34 is a tube 52, in communication with the passageway 44 in the plunger and slideable in a bore 54 in the casting 30. (The drawing omits the piston which actuates the thimble 28.)

Opening into the chamber 56 of the casting below the piston 34 is an air conduit 58 which connects to a chamber 60 a valve 61a. A valve head 61 is mounted on a stem 66 having axially parallel surface flutes 68, the whole sliding in a bore 70 in the casting 72, which houses the chamber 60. A reduced portion of the stem is shown at 74 so that when the valve is in the upper dotted position 76, air from the chamber 60, which in present machines is maintained at 30 pounds, will flow past the valve head 61 around the reduced portion of the stem 74 and into the passageways 78 and 80. The flutes 68 at their lower ends open into a circumferential groove 82 beneath a cam head 84 on the end of the stem 66 so that when the valve is in the solid-line position shown, any compressed air in the passageways 78 and 80 will evacuate down the flutes and out the ring groove 82. On the other hand, when the valve is in the dotted-line position 76, the inside annular shoulder 86 of the cam head 84 seats against the wall of the casting so that with compressed air flowing from the chamber 60 into the passageways 78 and 80, the air cannot escape past the cam head 84.

The cam head is driven by a standard mechanism wherein a timing drum 88, a portion of which is shown, carries on a circumferential arc of the drum an "up" button 90 and a "down" button 92. Between the buttons and the cam head 84 is an arm 94 pivoted at 96 with a cam portion 98 and a detent 100. In the same vertical plane as the arm 94 is a latch 102 pivoted at 104 with a recess 106 and a spring, not shown, urging the latch 102 to the left. When the "up" button 90 strikes the cam surface 98, it raises the cam head upwardly and as the button passes under the cam surface 98, the detent 100 locks in the shoulder of the rings of the latch 102 and holds the valve head 61 in the dotted position 76. As the button 92, which is radially of the drum higher than the up button, moves to the right in the direction of the arrow 108, it clears the cam surface 98 but engages the lower end of the latch 110, moving it to the right and permitting the arm 94 to drop down. The valve 61 under the pressure of the spring 64 reseats.

The passageway or duct 78 opens into a port 112 in which seats a needle valve 114 which may be adjusted to permit the passage of air in any desired volume. Compressed air flows from the passageway 78 into the passageway 58 to function the piston 34.

The passageway 80 is connected through a pipe 116 to applicant's vacuum-flow valve 118. This valve consists of a housing 120 having a piston chamber 122, a piston 124, an axial bore 126 in which is disposed a spool 128 which contacts the piston 124 at 130. The spool has a collar 132. Positioned between the collar 132 and the upper end of the bore 126 is an expansion spring 134 which urges the spool, and hence the piston, downwardly toward the orifice 136.

The spool has an external diameter substantially less than that of the bore and at either end brass bushings 138 and 140 seal the external surface of the spool and the internal surface of the bore from the chambers at either side of the bushings, there being an annular chamber 142. Mounted in this annular chamber are three cords or spacers, 144 and 146, being identical while the middle spacer or cord 148 is longer. A detail of these cords is not necessary. Each consists of two rims 149 and 150 held in spaced relationship by rungs, rung 152 being shown in section, and 154 being shown in elevation. Adjacent the cord 146 is a port 156 which is connected to a cylinder 158 in which air is maintained at a pressure below 25 inches of mercury or about 2–5 p.s.i., absolute pressure. It is evident that the air pressure in the space occupied by the cord 146 will be the same as that in the cylinder 158. The cords are spaced by Teflon seals such as 160, and the entire assembly is held tightly together against axial movement by means of the brass bushings 138 and 140.

The spool 128 has an inside cylindrical chamber 162 indicated by the dotted line. Through the wall of the spool 128 forming the chamber 162 are two rings of ports 164 and 166. These rows of ports are spaced so that when the spool is in the solid-line position shown, air around the cord 146 is free to move through the ports 164 into the chamber 162 and then out of the chamber 162 through the port 166 into the space occupied by the cord 148 and thence from that space into the duct 168 and thence to the passageway 44 in the plunger.

The space occupied by the cord 144 communicates by a port 170 to a valve 172 which comprises a chamber 174 supplied with compressed air at 40–45 p.s.i., and this valve includes a valve head 178 actuated by the same type of stem, latch buttons, and the same drum 88 as heretofore described.

It will be appreciated that the valve 172 is adjacent laterally to the valve 61a because the two drums 88 as shown are the same drum. It should also be stated that, because present machines have the valve 172 mounted on the valve block, which however contains air at only about 30 p.s.i. absolute pressure, this pressure being the pressure for which the operating parts of the machine are intended to function, applicant in order to use a 45-pound pressure counter-blow taps the 30-pound air from the valve block and uses this to operate what amounts to a relay which under such a construction would be the valve 172.

When the counter-blow button 182 strikes the valve stem 180, counter-blow air at 45 pounds moves up passageway 184 into the space occupied by the cord 144.

In FIGURE 2, the parison mold is shown with a baffle plate 186 mounted on top of the cavity 20 of the same parison mold shown in FIGURE 1. This baffle plate includes axial bore 188 with a small port 190 through the base of the baffle with a valve seat at 192. Mounted in the bore and port is a valve stem 194 with head 196, which is urged into seated position by a spring 198. The bore 188 is connected to a source of compressed air through the tube 200.

*Operation*

The apparatus shown is designed to perform two steps in the making of a bottle, firstly, the step from the time the glass gob is dropped into the inverted mold to the time that the glass in the ring neck has sufficiently chilled to take a set, and the second step of counter-blowing the glass gob into a bottle parison.

The operating parts of a glass machine are timed from the drum 88. The button 90 is positioned on the drum so that it will actuate the valve 61 at the moment when the glass gob 12 is about to drop from the deflector 10. When this occurs, air pressure immediately actuates the valve 118 because the pipe 116 is only about six inches long. This throws the spool 128 into the solid-line position and air is sucked out of the parison mold cavity. At the same time that this occurs, the compressed air flows past the needle valve 114 and pushes the piston 134 up. The rate at which the piston moves up is controlled by the adjustment screw 115. Applicant sets the air flow in accordance with the size of the gob of glass and its temperature to that as the glass descends in the parison mold, the plunger tip 46 will seat in the ring neck mold 26 just as the glass reaches the ring neck mold. This permits the ambient air passing through the parison mold to cool the system while the plunger is coming up. The very low pressure while the plunger is rising operates through the orifice of the ring neck mold and draws the gob of glass downwardly.

When the time has come for counter-blowing, the button 92 is positioned to close the valve 61, and when this occurs, the air in the lines 58 and 116 is released down the flutes of the valve stems 66. The button 182 which on present machines is on the circumferential channel, carry the buttons 90 and 82, is positioned on the drum so that it will open the valve 178 at any desired point after the plunger starts to retract. The piston 124 has dropped into its lower position, the passageway 184 is now connected to the passageway 44 in the plunger, and hence the position of the button 182 on the drum will control the time of bringing on the counter-blow subject only to valve 118. By setting the button 182 further to the left, the valve 178 may be opened as much as a second after the spool 128 has dropped into its lower position and connected passageway 84 to 184. On the other hand, on making bottles with a small amount of glass in the neck, applicant advances the button 182 to the right and he may advance the button to a point such that the high pressure air in the line 184 is in the space occupied by the cord 144 when the plunger is still in the "up" position. When he does this, and the button 92 releases the valve 61, the spool 128 instantly drops down with the result that a suction pressure in the passageway 44 of the plunger changes instantly to a high pressure of 40–45 pounds for counter-blowing.

As the counter-blow proceeds, the glass is blown up against the baffle. In practice, when the baffle is off the tops of the parison mold, applicant blows air through the duct 200 which cools the valve head 196. Just before the baffle seats, this air through the duct 200 is released so that the valve head 196 moves upwardly under the influence of the spring 198. This spring, however, is weak and is so adjusted that in its upper position, there is an annular clearance between the valve head 196 and the valve seat 192 of 0.070-inch, and there is also a like clearance between the valve stem 194 and the port 190 through which it is positioned so that on the counter-blow step, air may escape easily through the top of the cylinder. When the glass reaches what is to be the bottom of the parison, it strikes the valve head 196 and completes the closing. As the valve head 196 is comparatively cold, it chills the center portion of the bottom of the parison and in effect forms and completes the central portion of what ultimately becomes the bottom of the bottle.

Referring to FIGURE 1, in the ring neck mold 26, there is a circular channel 91 recessed from the orifice, and this circular channel opens into recess 101. There is a clearance between the faces of the two components of the ring neck mold 26 of about 0.007-inch. The recess 101 with tips 103 approaching the edges of the mold are cut out by abrading tools and suction is applied to the circular channel 91 for a moment or two after the plunger 32 seats in the dotted-line position shown through the passages 48 and 50. In applicant's method, the plunger is seated for a very short period of time, but these recesses, in which the air is at a pressure of 2–5 pounds help maintain the cooling and assist in releasing any of the rarefied air that may still be in the lower part of the parison mold cavity when the plunger actually seats.

As described in the copending application, the apparatus herein makes it possible to practice a method whereby hot glass is used in the bottle orifice and also in the bottle bottom and because applicant does not use a baffle and does not use settle-blow, applicant is able to start counter-blowing immediately after the finish on the orifice is completed.

In the claims, valve 61a is referred to as the "control valve"; valve 118 is referred to as the "suction control valve" "bottle orifice mold portion" is that portion in the ring neck mold 26; "open sided chamber" is the passageways 80 and 82 of the thimble 28; "tubular drive rod" is below and connected to the plunger 32.

Having thus described his invention, what applicant claims is:

1. A parison mold assembly for a glass bottle-making machine comprising a mold having a cavity, a bottle orifice mold portion in said cavity, a passageway through a wall of the mold into said orifice portion, a housing having an open sided chamber mounted with the open side adjacent said passageway, a plunger having a tip seatable in said passageway, a duct in the plunger beneath the tip, a tubular drive rod drivingly connected to said plunger and reciprocatable by a cylinder, an air duct connecting the duct in the plunger to the inside of the drive rod, a port into the tubular drive rod outside the chamber, and means for introducing air into, or withdrawing air from, said chamber through the port.

2. The parison mold assembly of claim 1 wherein the port into the tubular drive rod is in the axis of the cylinder and on the side opposite the plunger.

3. The parison mold assembly of claim 1 wherein the passageway into the orifice portion of the mold, the chamber and the drive rod are coaxial.

4. The parison mold assembly of claim 1 where the means for introducing into, or withdrawing air from, said chamber comprises a single outlet, double inlet suction control valve, a duct connecting the outlet to the port into the tubular drive rod, a source of air under pressure connected to one inlet, a source of vacuum connected to the other inlet, together with means for actuating the cylinder in timed relationship with the withdrawal of air from the chamber.

5. A parison mold assembly for a glass bottle-making machine comprising a mold having a cavity, a bottle orifice mold portion in said cavity, a passageway through a wall of the mold into said orifice portion, a housing having an open sided chamber mounted with the open side adjacent said passageway, a plunger having a tip seatable in said passageway, a duct in the plunger beneath the tip, a tubular drive rod drivingly connected to said plunger and reciprocatable by a cylinder, an air duct connecting the duct in the plunger to the inside of the drive rod, a port into the tubular drive rod outside the chamber, a single outlet, double inlet suction control valve, a duct connecting the outlet of said valve to the port of the tubular drive rod, a source of air under pressure connected to one inlet, a source of vacuum connected to the second inlet, a control valve having two fluid, delivery outlets, one connected to the first valve for actuating the same, and the other connected to the cylinder, and means in the line connected to the cylinder for adjusting flow and thereby timing the seating of the plunger with respect to withdrawing air through the mold orifice.

References Cited by the Examiner
UNITED STATES PATENTS

| | | | |
|---|---|---|---|
| 1,878,863 | 9/32 | La France | 65—234 |
| 1,949,886 | 3/34 | Soubier et al. | 65—223 |
| 1,959,428 | 5/34 | Hoge | 65—233 |
| 2,251,010 | 7/41 | Allen | 65—263 |
| 2,466,669 | 4/49 | Winder | 65—233 X |
| 2,826,867 | 3/58 | Nava et al. | 65—229 |

DONALL H. SYLVESTER, *Primary Examiner.*

MORRIS O. WOLK, *Examiner.*